(12) United States Patent
Grimoldi et al.

(10) Patent No.: US 12,251,656 B2
(45) Date of Patent: Mar. 18, 2025

(54) EQUIPMENT AND METHOD FOR THE PRODUCTION OF FILTERING PANELS

(71) Applicant: SAATI S.P.A., Appiano Gentile (IT)

(72) Inventors: Matteo Grimoldi, Appiano Gentile (IT); Maddalena Ganna, Appiano Gentile (IT); Paolo Canonico, Appiano Gentile (IT)

(*) Notice: Subject to any disclaimer, the term of this patent is extended or adjusted under 35 U.S.C. 154(b) by 0 days.

(21) Appl. No.: 18/685,248

(22) PCT Filed: Oct. 13, 2022

(86) PCT No.: PCT/IB2022/059823
§ 371 (c)(1),
(2) Date: Feb. 21, 2024

(87) PCT Pub. No.: WO2023/067446
PCT Pub. Date: Apr. 27, 2023

(65) Prior Publication Data
US 2024/0325953 A1 Oct. 3, 2024

(30) Foreign Application Priority Data
Oct. 18, 2021 (IT) .................. 102021000026690

(51) Int. Cl.
| B01D 46/00 | (2022.01) |
| B01D 29/05 | (2006.01) |
| B29C 45/14 | (2006.01) |
| B29L 7/00 | (2006.01) |
| B29L 31/14 | (2006.01) |

(52) U.S. Cl.
CPC ......... B01D 46/0001 (2013.01); B01D 29/05 (2013.01); B29C 45/14024 (2013.01); B29L 2007/002 (2013.01); B29L 2031/14 (2013.01)

(58) Field of Classification Search
None
See application file for complete search history.

(56) References Cited

FOREIGN PATENT DOCUMENTS

| CN | 104512000 A | * | 4/2015 | ....... B29C 45/14024 |
| CN | 110181756 A | | 8/2019 | |
| WO | 2015/185736 A1 | | 12/2015 | |
| WO | 2019/123371 A1 | | 6/2019 | |

OTHER PUBLICATIONS

English language machine translation for CN 104512000 A. Retrieved from translationportal.epo.org on Oct. 3, 2024. (Year: 2024).*
ISR; European Patent Office; NL; Mar. 1, 2023.

* cited by examiner

*Primary Examiner* — Jason M Greene
(74) *Attorney, Agent, or Firm* — Patshegen IP; Moshe Pinchas

(57) ABSTRACT

Method and related equipment for the production of filtering panels (8) made up of a filtering fabric (5) locked and tensioned inside a frame (7) consisting of two mutually coupled half frames (7a, 7b), wherein the moulding of said frame (7) of said panel (8), the unwinding of said fabric (5) from a feeding roller (4) and the tensioning of the same fabric (5) in the frame (7) are carried out, the latter being performed automatically during said moulding step. Compared to the solutions employed in the prior art, the equipment and the method of the invention offer the advantage of automating every operation for assembling the filtering panel, locking the fabric in a centered position on the frame in the making, tensioning it and cutting it out around the frame already moulded on the panel.

9 Claims, 16 Drawing Sheets

EQUIPMENT AND METHOD FOR THE PRODUCTION OF FILTERING PANELS

BACKGROUND OF THE INVENTION

The present invention relates to an equipment and the related method for the production of filtering panels.

The field of the invention is that of the production of filtering panels, wherein a fabric of filtering material is tensioned and fixed for moulding inside a frame. The panels of this type are employed in the filtration of municipal and industrial waste water, for the separation of flours, in screen printing and the like.

The methods currently in use for producing the aforementioned filtering panels provide for arranging the filtering fabric, already cut out according to the measurements of the frame which receives it and subsequently fixed on the latter, by manual centering operations among these parts. The preliminary operation of fabric cutting requires in particular the execution of drillings, needed in order to achieve the necessary points of reference for the manual centering of the fabric with respect to the frame, before the moulding of the latter.

The above described operations present however the significant drawback, not only of prolonging the production time of the filtering panels, but also that of increasing the possibility of errors in the manual assembly of the fabric on the frame, with considerable formation of rejects and consequential increase in the costs of manufacturing of the product as a whole.

SUMMARY OF THE INVENTION

The main object of the invention consists in providing a new method and the related equipment for the moulding of filtering panels of the above described type which, compared to the prior art, allow the speed up of the panel production, in a completely automatic way, with no error and with a significant reduction of rejects of the filtering fabric being used.

This and other objects are achieved by the equipment defined in the claims.

Compared to the solutions employed in the prior art, the equipment and the method of the invention have the advantage of automating every operation for assembling the filtering panel, locking in position the fabric centered on the frame during the formation, tensioning it and subsequently cutting it from the unwinding roller of the fabric itself.

BRIEF DESCRIPTION OF THE DRAWINGS

These and other objects, advantages and characteristics result from the following description of the equipment and the method of the invention illustrated, by way of a non-limiting example, in the figures of the attached drawings. In them.

DETAILED DESCRIPTION OF PREFERRED EMBODIMENTS

Figure 1:
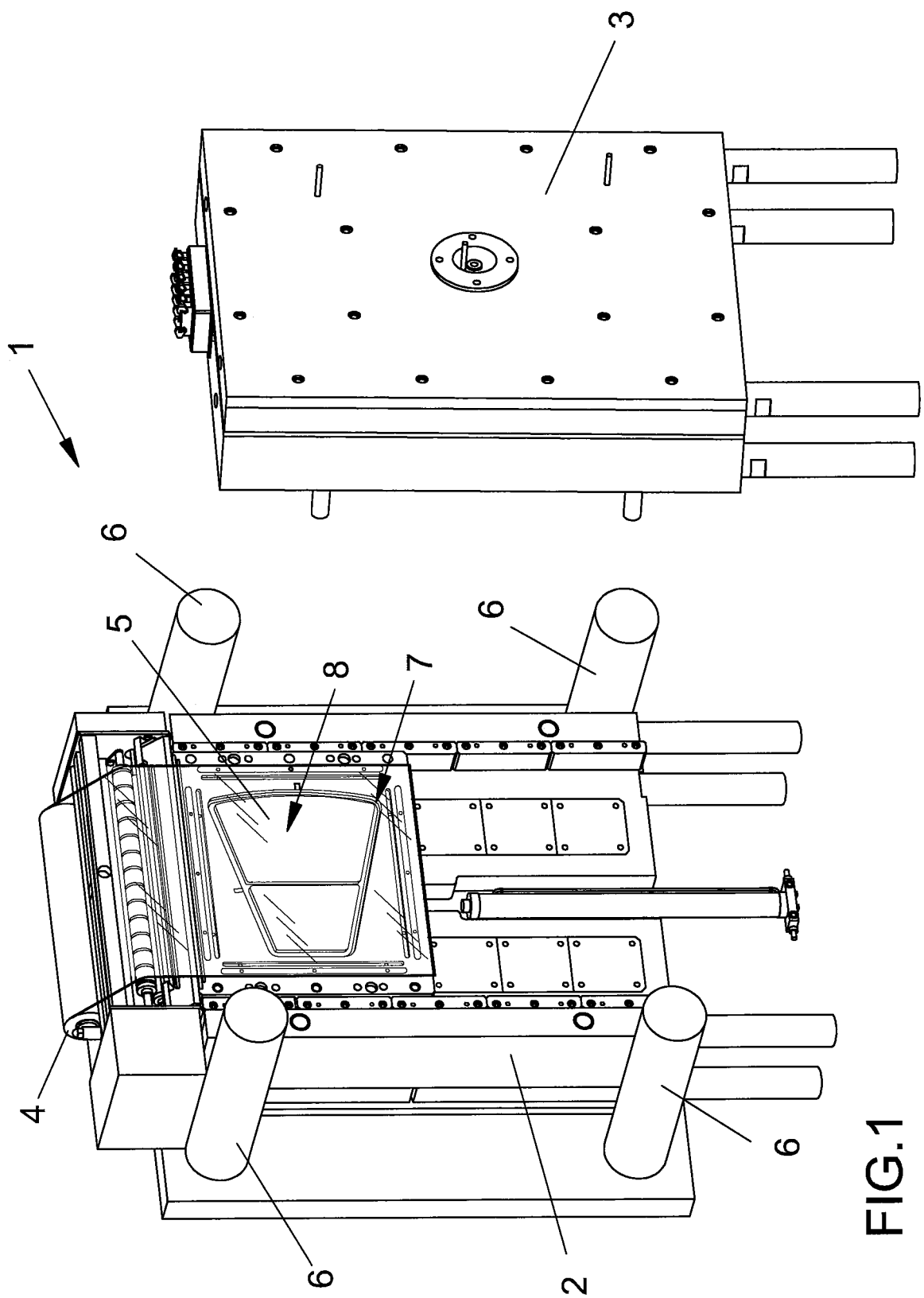
FIG. 1 shows in a schematic overall view the equipment of the invention.
Figure 15:
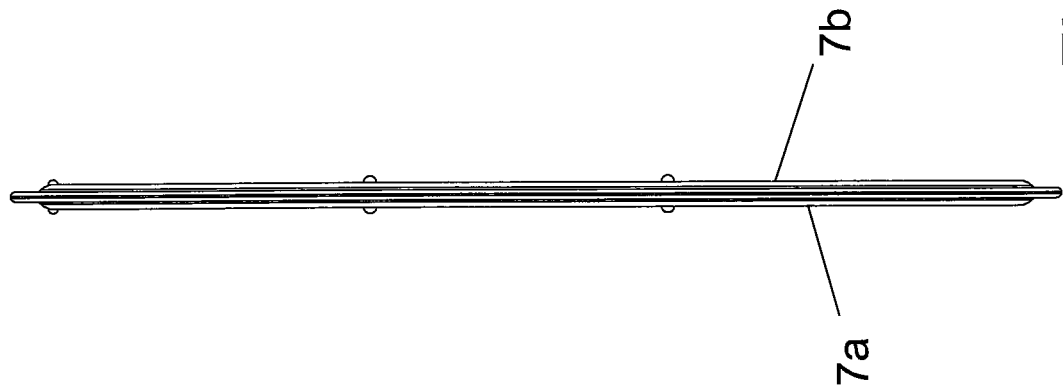
FIGS. 14 and 15 respectively show in plan view and in side view the filtering panel produced with the equipment and the method of the preceding figures.
Figure 14:
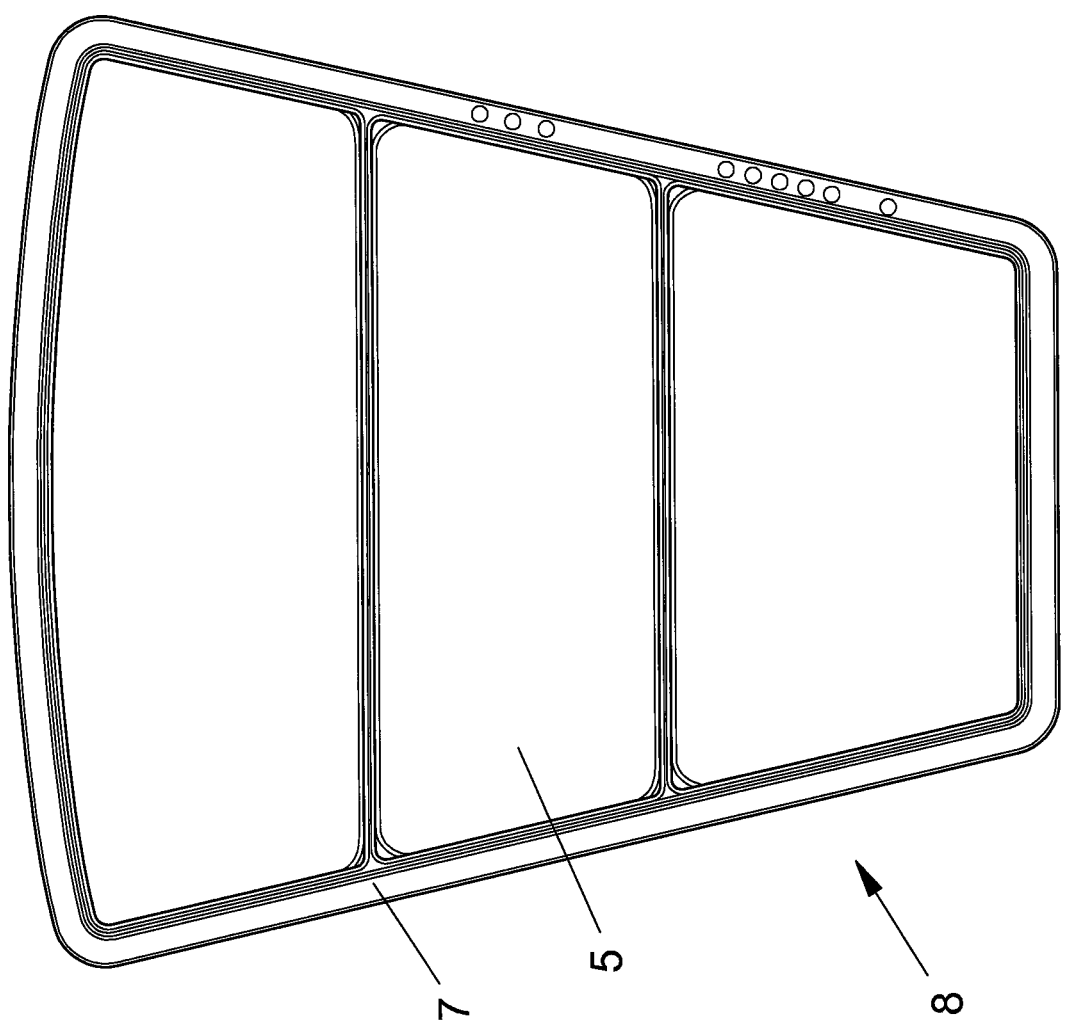

The equipment of the invention, referred to as a whole with the numeral 1 in FIG. 1, comprises a frame inside of which the moving mould half 2 and the fixed mould half 3 are mounted. An unwinding roller 4 of the filtering fabric 5 of the panel 8 illustrated in FIGS. 14 and 15 is furthermore present. The equipment of the invention further includes the press 6 carrying out the injection moulding of the frame 7 of the panel 8.

Figure 2:
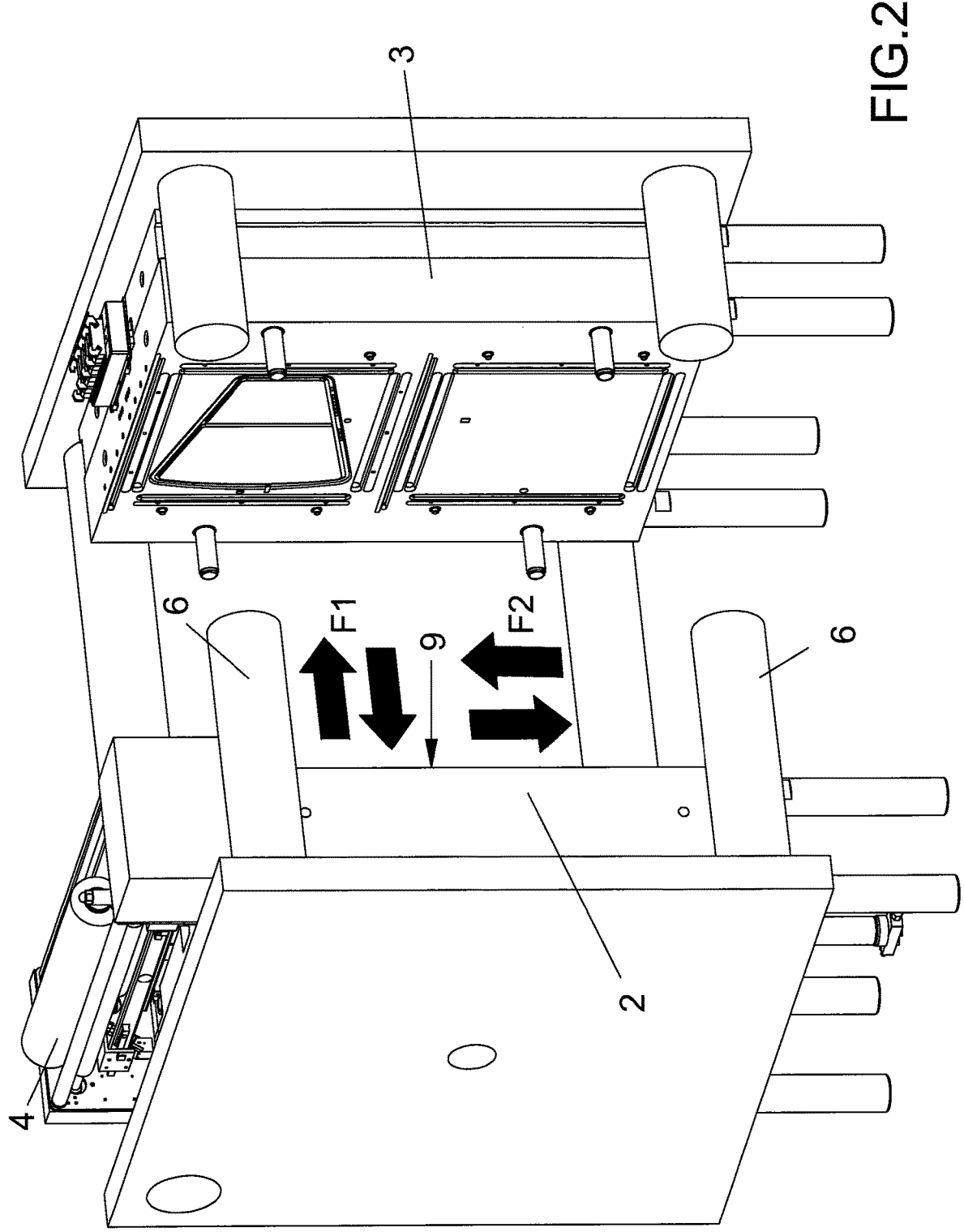
FIG. 2 shows the fixed and moving mould halves fitted on the equipment of the invention.
Figure 3:
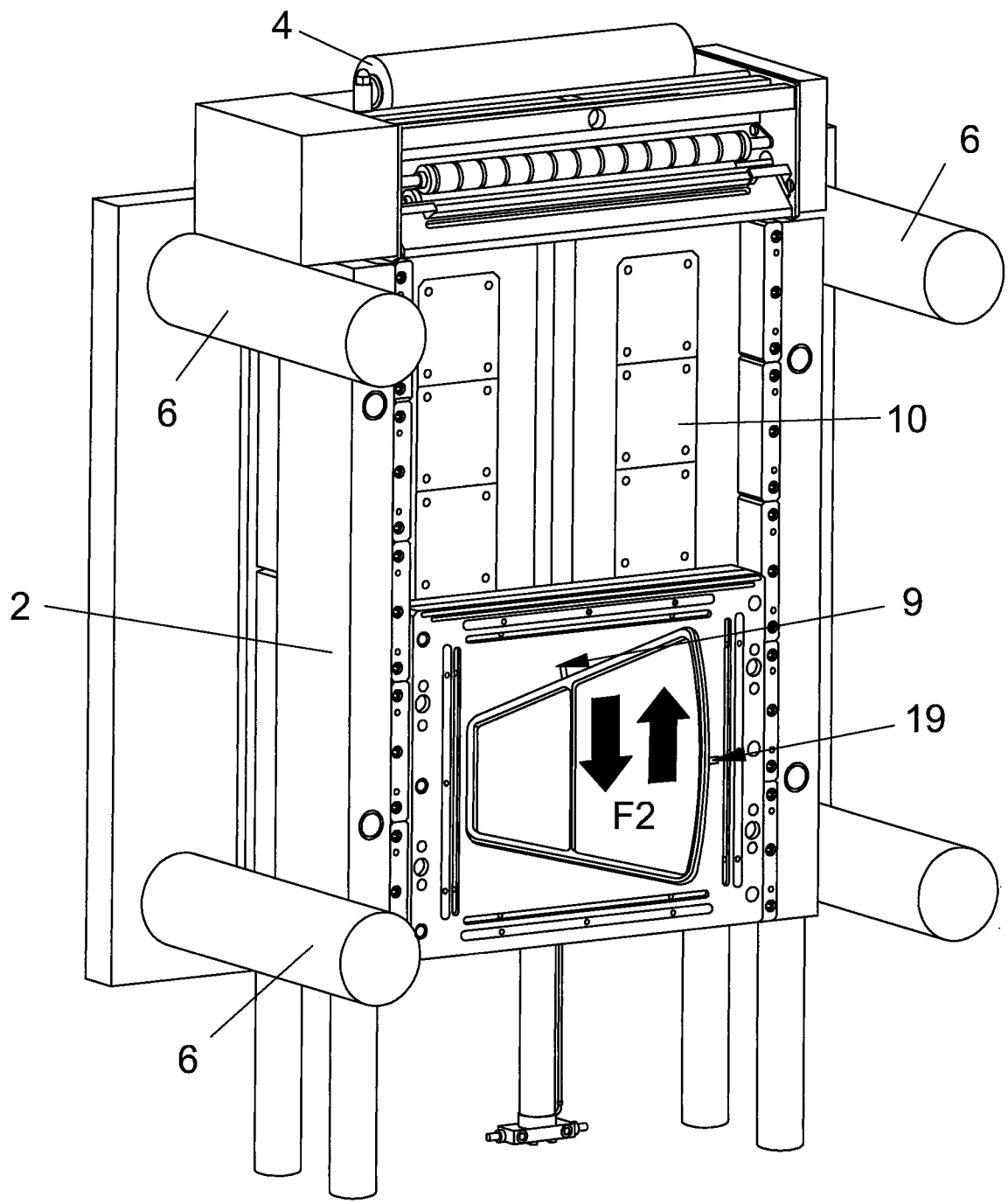
FIGS. 3 and 3a show the moving mould half of the equipment of the preceding figures, provided with a sliding mould insert equipped with the matrix for the moulding of the first half frame of the filtering panel.

In FIGS. 2 and 3 the mould half 2 is shown, movable in the direction of the arrows F1 with respect to the fixed mould half 3, with a view on the mould insert 9, in turn mounted sliding in the direction of the arrows F2 inside its mould insert holder seat or guide 10 in the same mould half 2.

Figure 13:
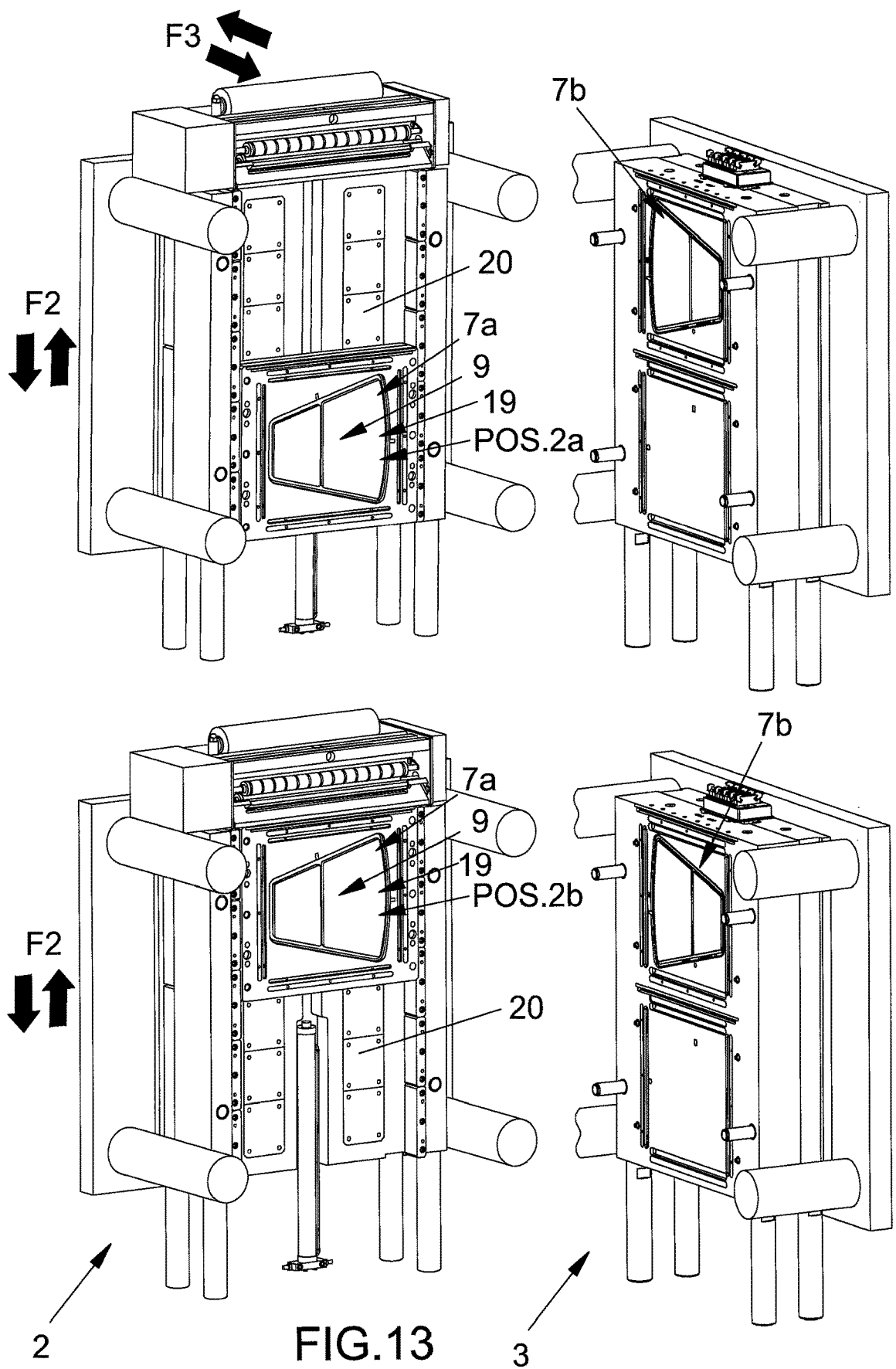
FIG. 13 shows the mould halves of FIG. 2, with a view to the locking, tensioning and cutting system of the filtering fabric.

In particular and as better shown in FIG. 13, the mould insert 9 slides, by means of the related carriage 20, in the direction of the arrows F2 inside the mould insert holder seat 10 of the moving mould half 2. In the initial step of moulding of the half frame 7a of the panel 8, the mould insert 9 is placed in the lower position 2a of the mould half 2 of the equipment 1. In the following step of moulding of the half frame 7b, on the half frame 7a already moulded in the preceding step, the mould insert 9 moves from the lower position 2a, wherein the moulding of the half frame 7a has been carried out, towards the upper position 2b of moulding of the half frame 7b of the filtering panel 8.

Figure 3A:
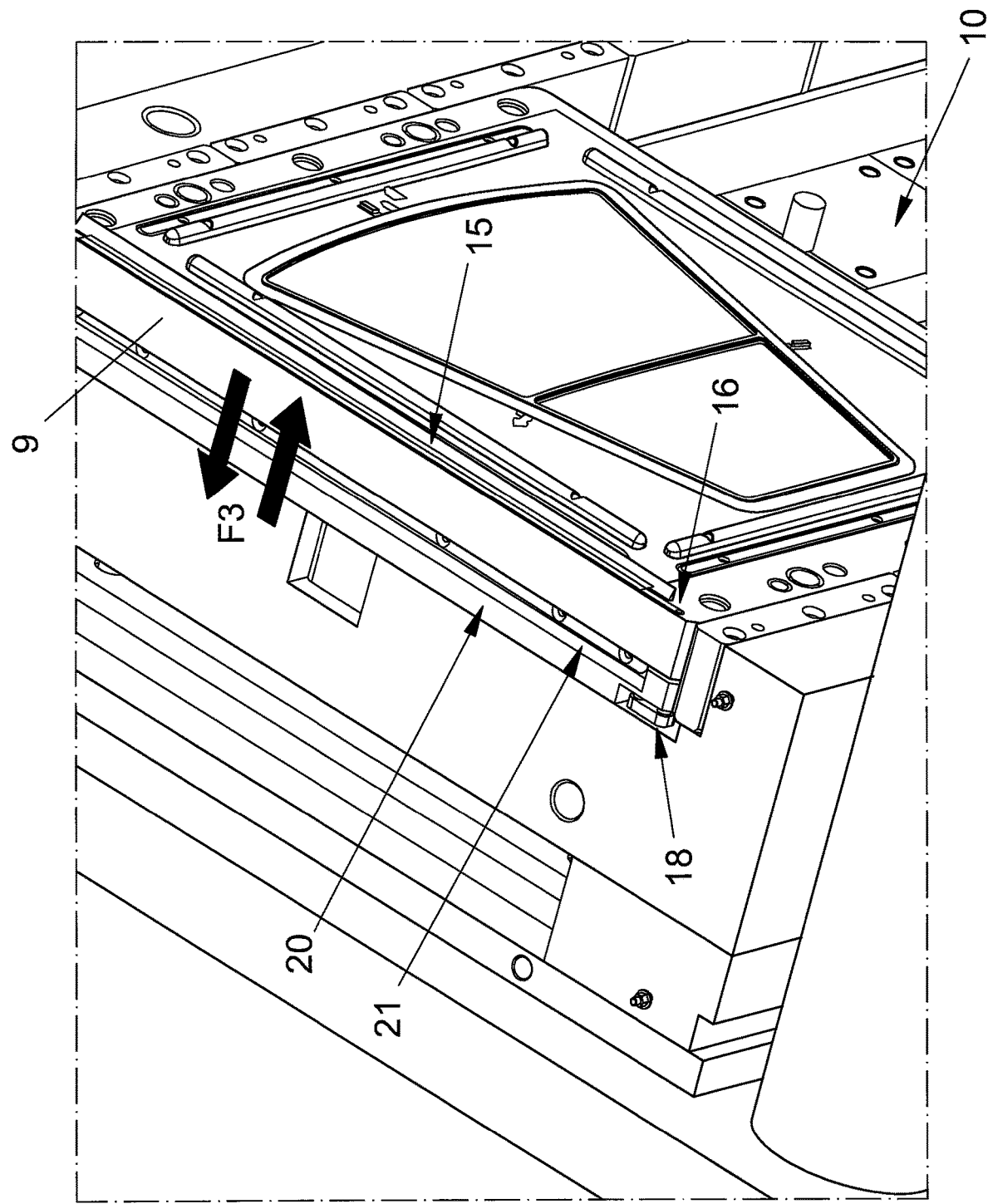

According to the invention, the mould insert 9 is moreover mounted movable inside its seat 21 in the carriage 20, in the direction of the arrows F3 of FIGS. 3a and 13, in contrast to the action of springs 18.

Figure 4:
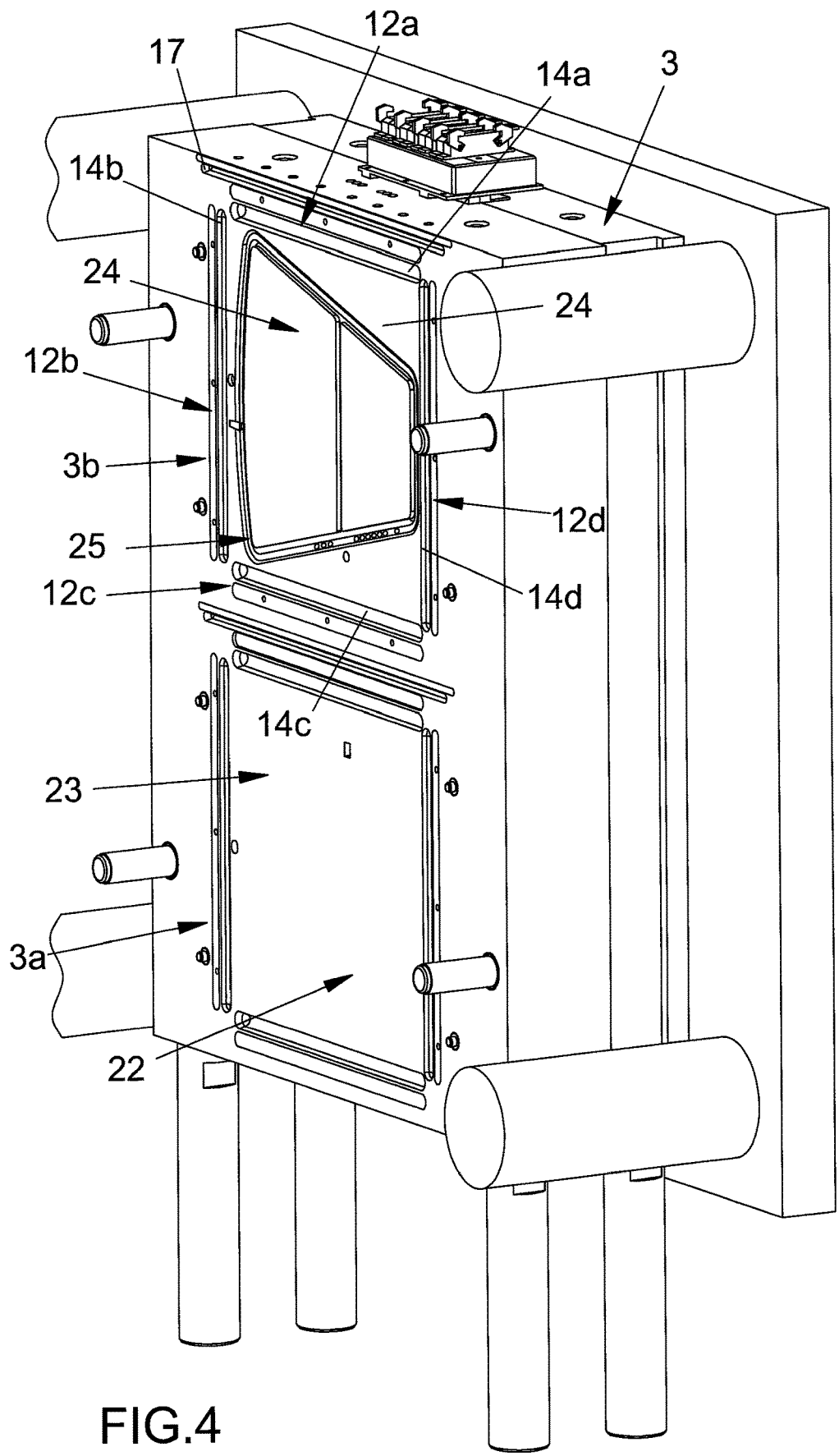
FIG. 4 shows the fixed mould half of the equipment of the invention, provided with mould inserts respectively for the moulding of the first half frame and for the moulding, on the latter, of the second half frame of the filtering panel.

As better illustrated in FIG. 4, the lower part 3a of the fixed mould half 3 of the equipment 1 of the invention includes a lower mould insert 22 bearing the punch 23 for moulding the first half frame 7a of the panel 8 of FIG. 15, in cooperation with the matrix 19 of the mould insert 9 in the position 2a of the mould half 2.

In its upper part 3b the fixed mould half 3 is provided with an upper mould insert 24, bearing the matrix 25 for moulding the second half frame 7b on the half frame 7a moulded at the lower parts 2a and 3a of the mould halves 2 and 3 respectively.

Figure 5:
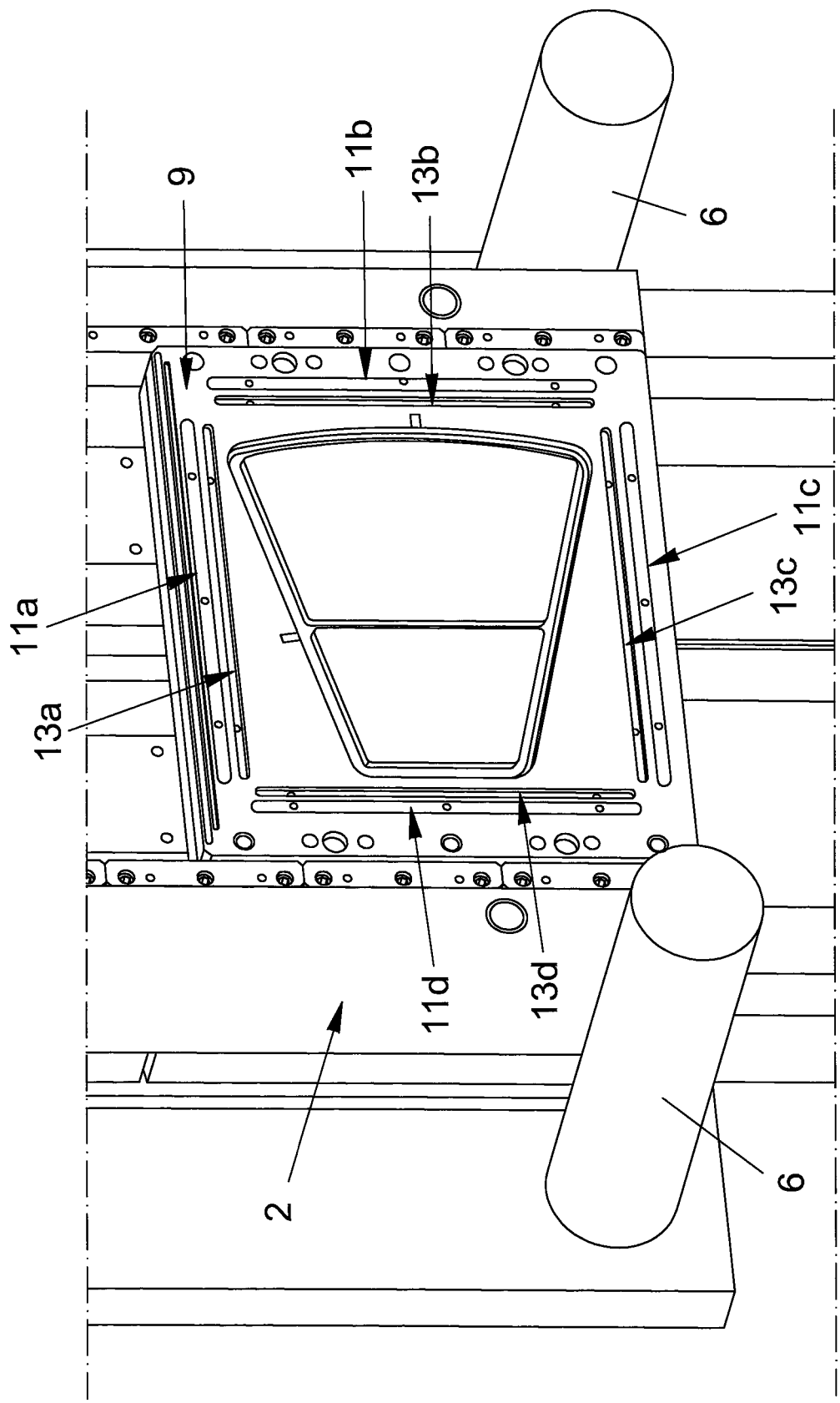
FIG. 5 shows the detail of the sliding mould insert of the moving mould half of FIG. 3.
Figure 6:
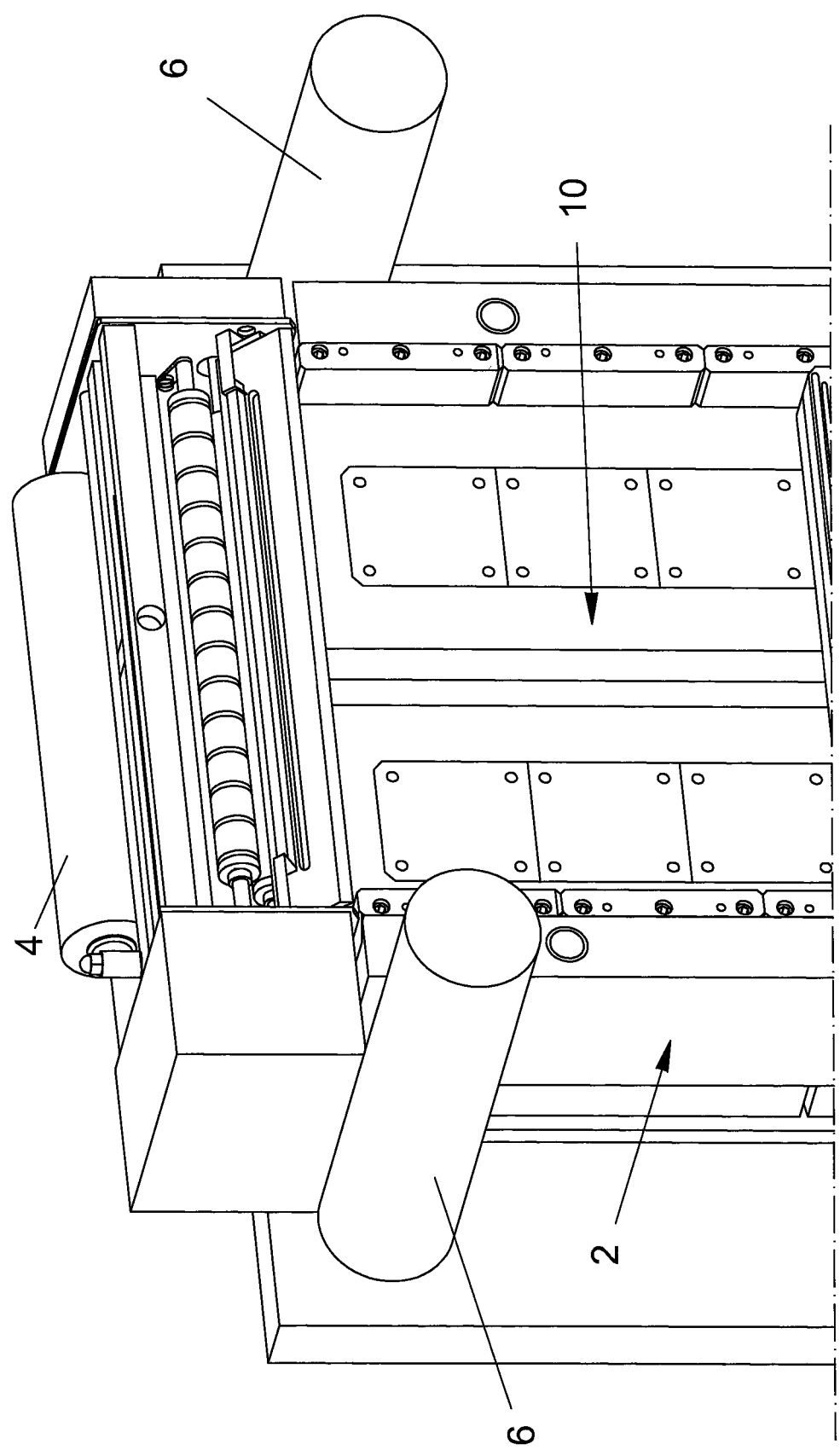
FIG. 6 shows the detail of the seat for the sliding of the mould insert of FIG. 5 in the moving mould half of FIG. 3.
Figure 7:
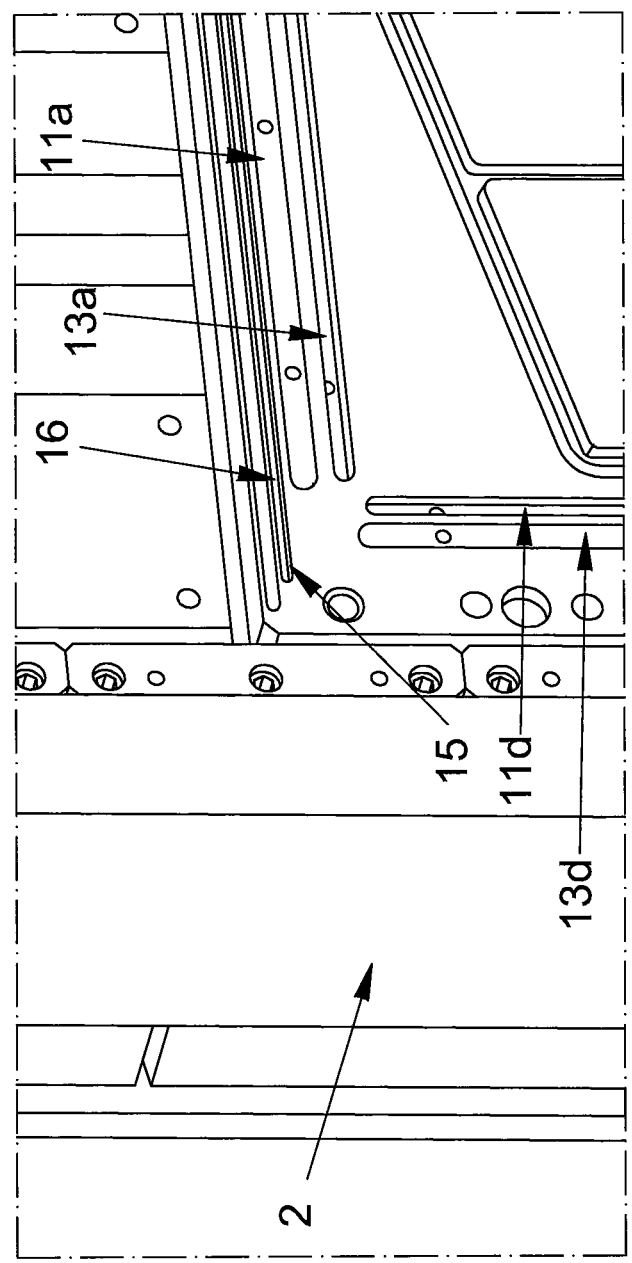
FIG. 7 shows the detail of the locking, tensioning and cutting system of the filtering fabric on the sliding mould insert of FIG. 3.

As shown in FIGS. 5, 7 and 13, the sliding mould insert 9 of the moving mould half 2 has inserts 11a, 11b, 11c, 11d, preferably made of an elastomeric material, suitable to lock the filtering fabric 5 by cooperation with the corresponding inserts 12a, 12b, 12c and 12d provided on the mould insert 24 of the upper part 3b of the fixed mould half 3.

To the described locking of the fabric 5 also contributes the displacement of the mould insert 9 inward its seat 21 in the carriage 20 supporting it, in contrast to the action of springs 18 biasing it against the upper mould insert 24 of the half frame 3 (arrows F3 in FIGS. 3a and 13).

On the same mould insert 9 are moreover provided, further inward with respect to the aforementioned inserts 11 and close to the matrix 19 for moulding the half frame 7a, corresponding punches 13a, 13b, 13c and 13d, which carry out the tensioning or the traction of the fabric 5 inside the frame of the panel, when the fabric is locked in the upper part 3b of the mould half 3 between the inserts 12 of the mould insert 24 and the inserts 11 of the mould insert 9.

The punches 13 of the mould insert 9 cooperate with the corresponding slots or grooves 14a, 14b, 14c, 14d intended for discharging the same punches 13 in the mould insert 24 of the upper part 3b of the mould half 3, arranged close to the matrix 25 for moulding the half frame 7b.

Figure 8:
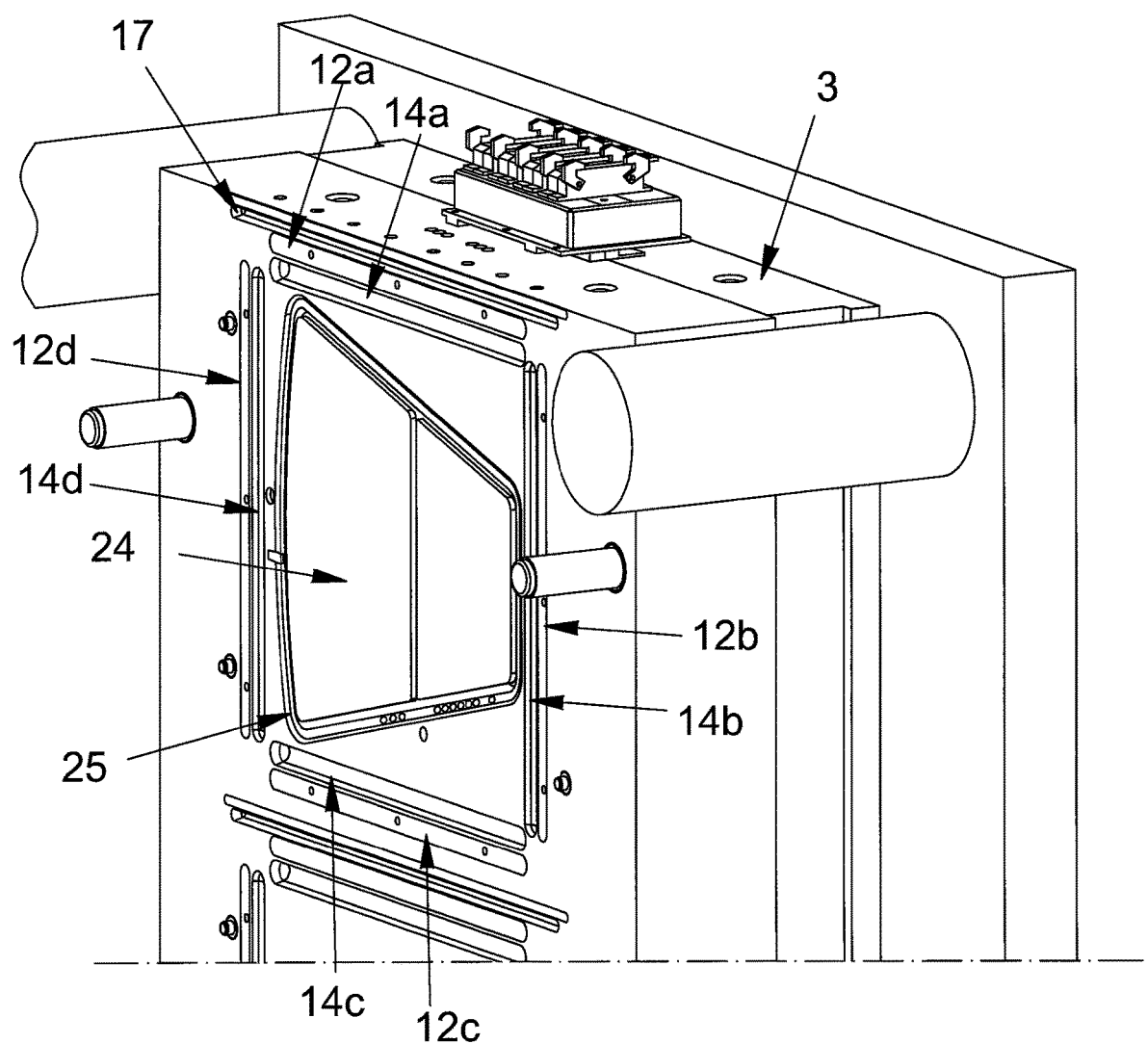
FIG. 8 shows the detail of the upper mould insert of the fixed mould half of FIG. 4, bearing the matrix for moulding the second half frame of the filtering panel.
Figure 9:
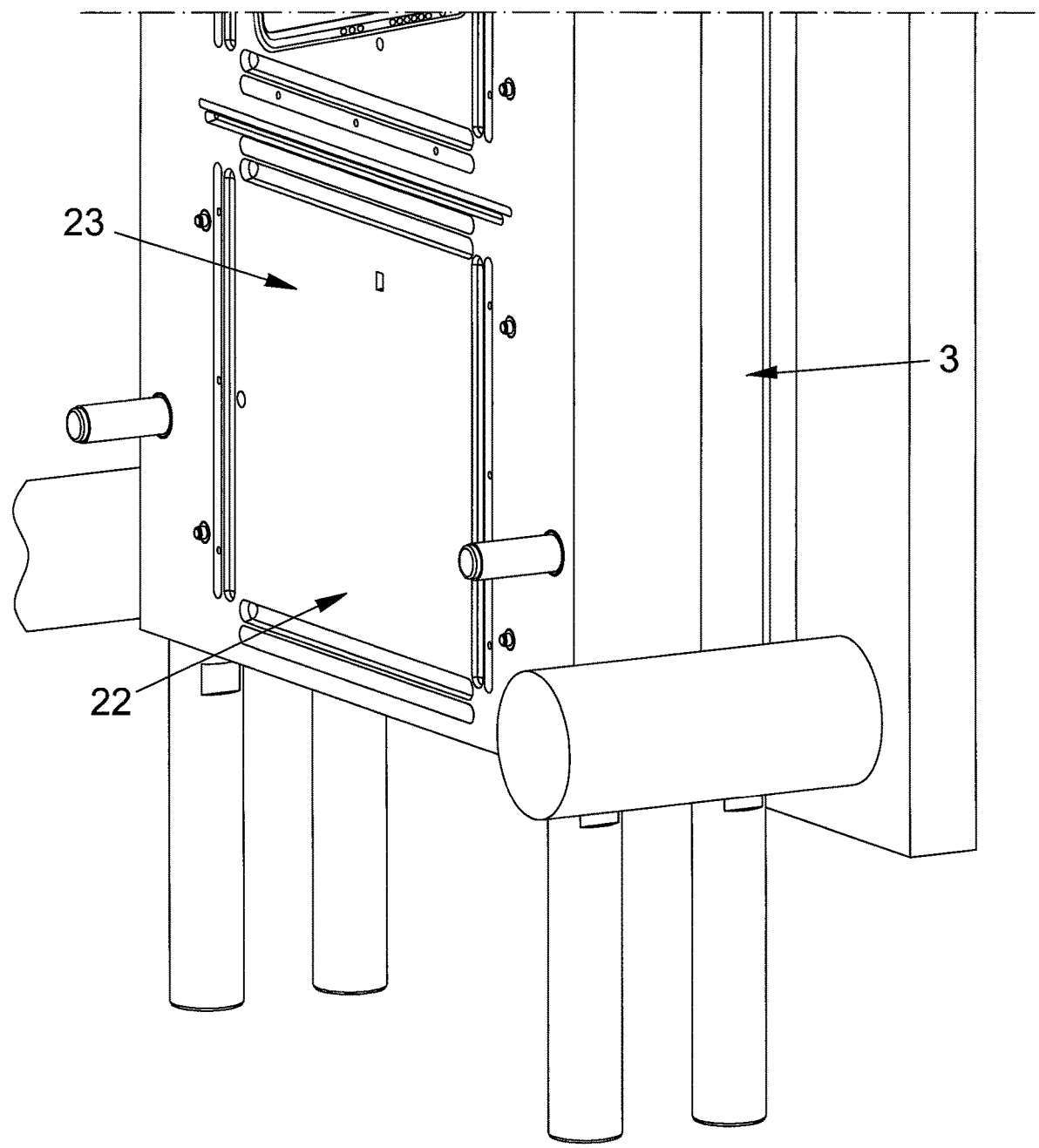
FIG. 9 shows the detail of the lower mould insert of the fixed mould half of FIG. 4, bearing the punch for moulding the first half frame of the filtering panel.

As better shown in FIGS. 3a, 7 and 13, on the upper part of the sliding mould insert 9 is moreover provided a blade 15, housed in a corresponding seat 16 positioned above the insert 11a, suitable for cutting the fabric 5 fed by the roller 4, cooperating with a corresponding hollow 17 provided in the mould insert 24 of the upper part 3b of the fixed mould half 3 in FIG. 8.

Figure 10:
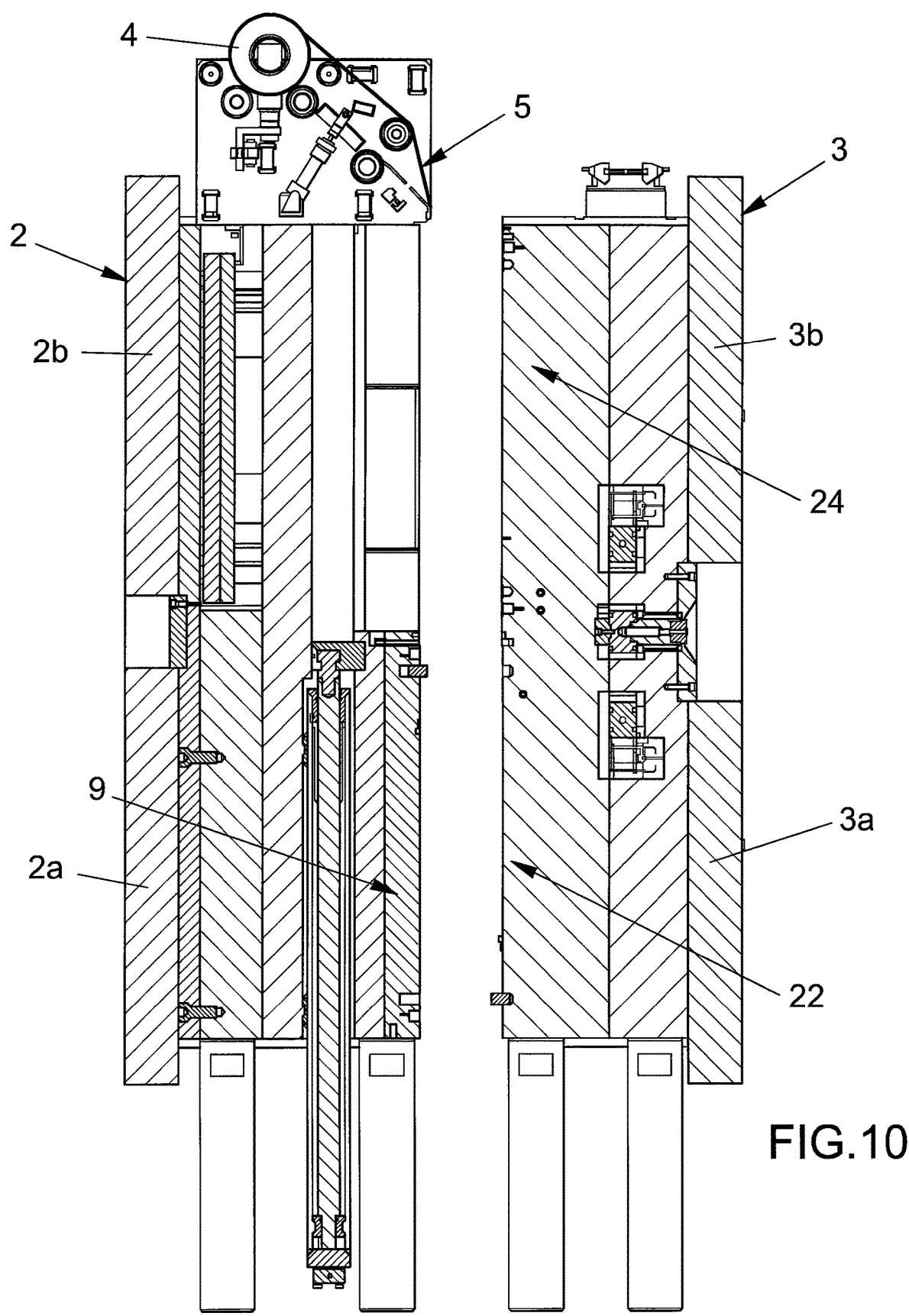
FIG. 10 shows a simplified scheme of the position of the fixed mould half and of the moving mould half in the initial moulding step of the filtering panel.
Figure 11A:
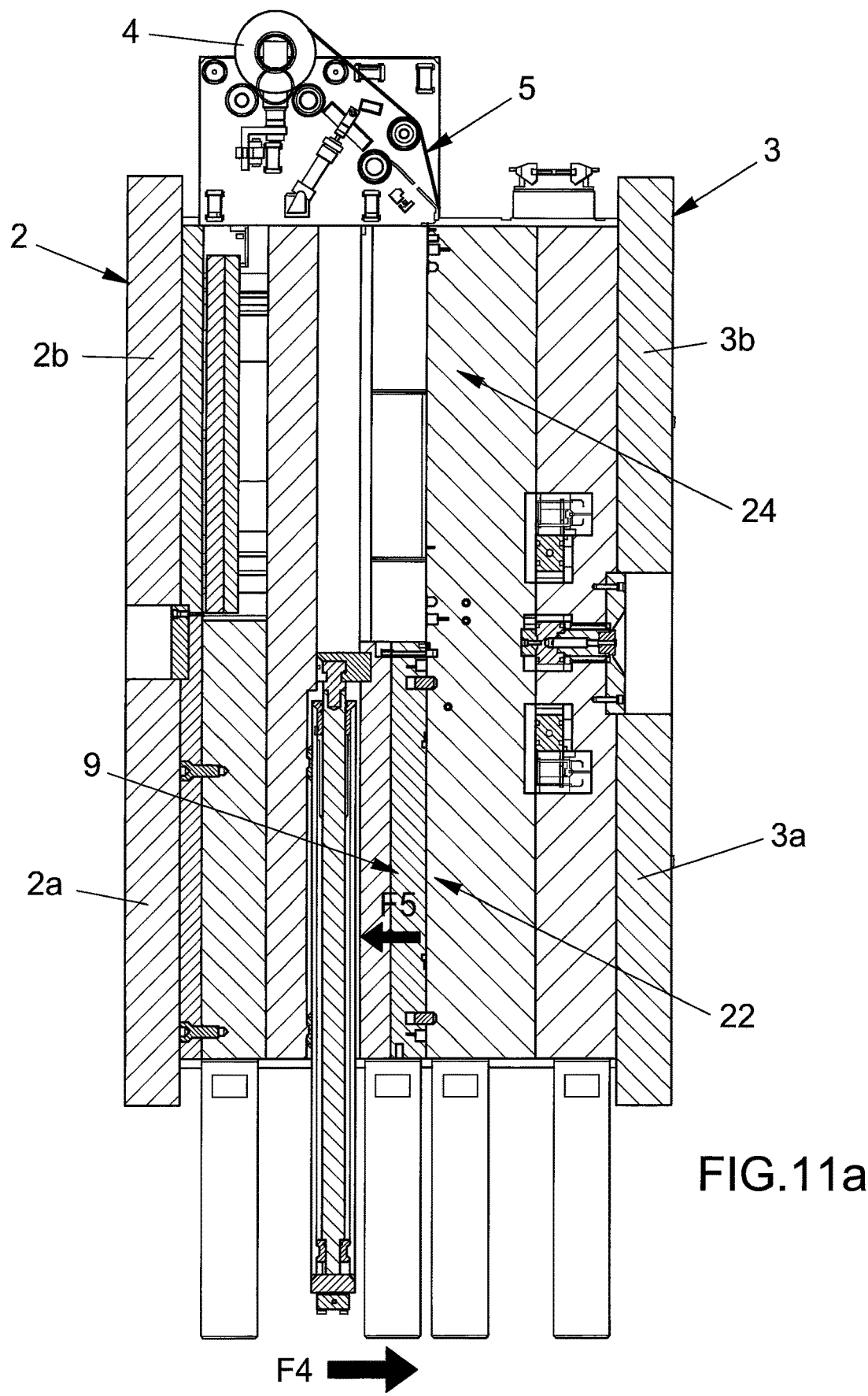
FIGS. 11a and 11b illustrate the step of moulding the first half frame of the filtering panel.
Figure 11B:
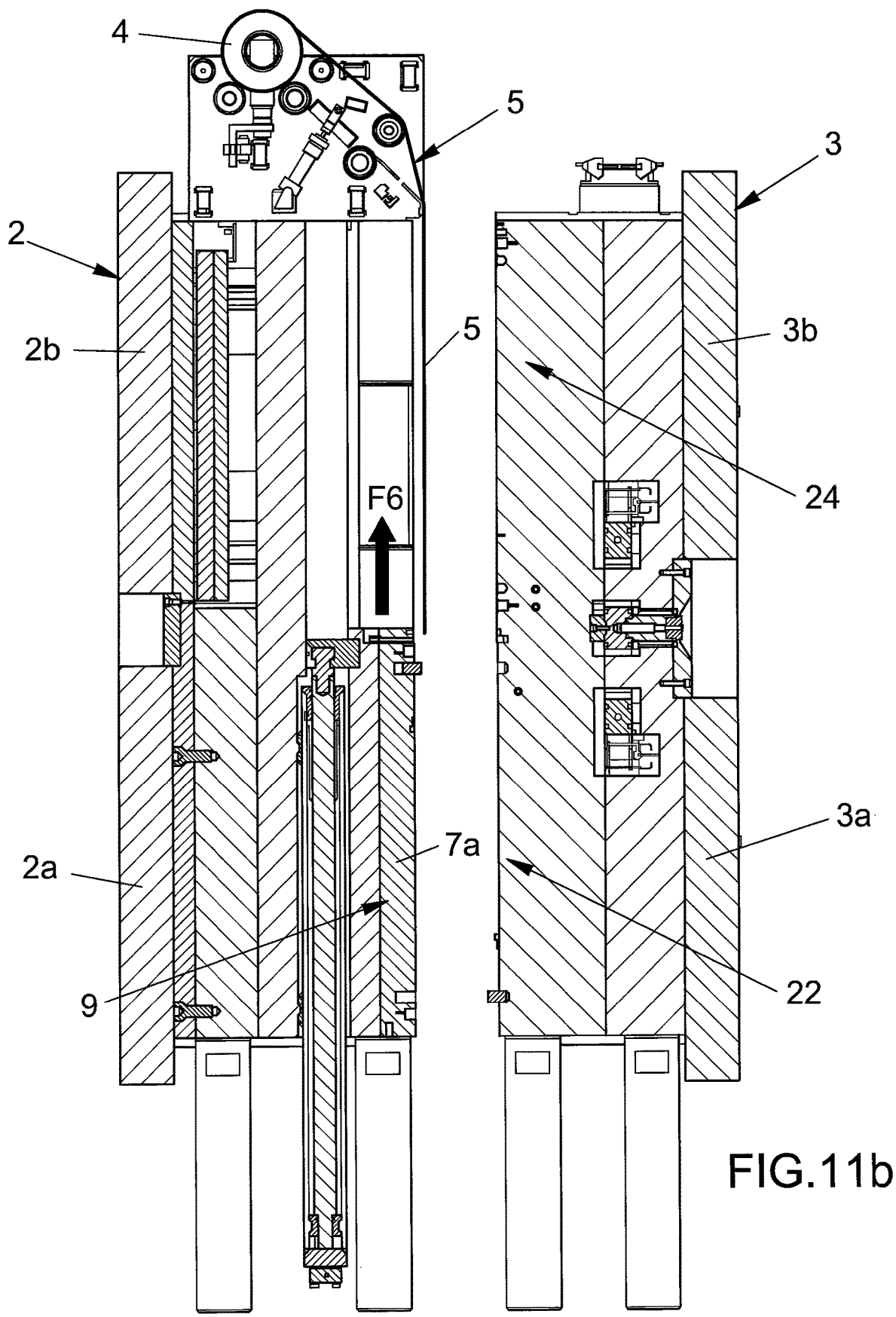
Figure 12:
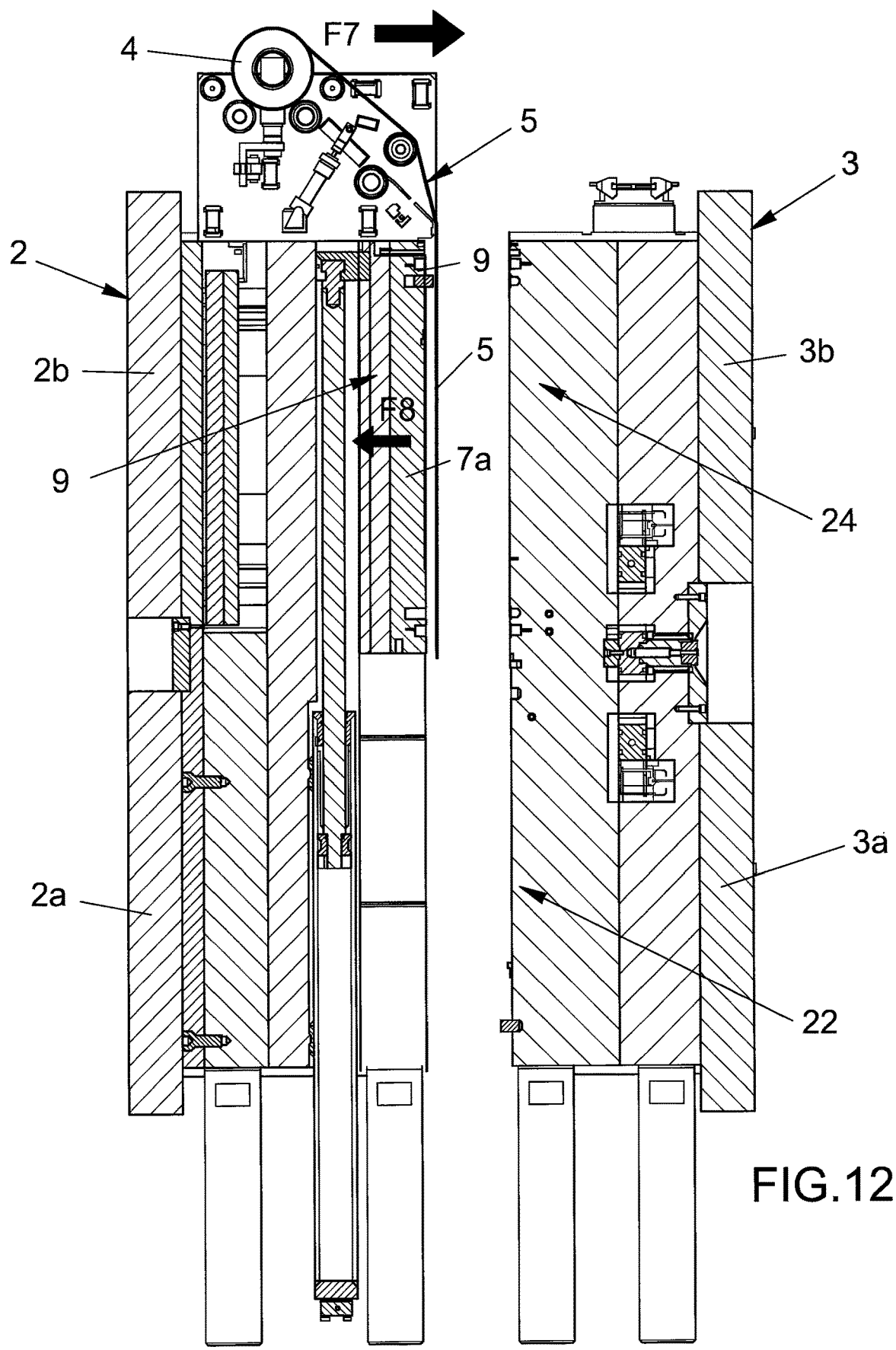
FIG. 12 shows the positioning of the sliding mould insert of the moving mould half in the moulding step of the second half frame, with tensioning and cutting of the filtering fabric.

The steps of the method of the invention are better represented in FIGS. 10 to 12.

In a first step of the method, the mould insert 9 of the moving mould half 2 is placed in the position 2a, at the lower part 3a of the fixed mould half 3 (FIG. 10). In this position the moving mould half 2 closes in the direction of the arrow F4 in FIG. 11a against the mould insert 22 provided in the part 3a of the fixed mould half 3, with consequent movement of the mould insert 9 back inside its seat 21 in the carriage 20, in contrast to the action of the springs 18 (arrows F5 in FIG. 11a).

With the closed mould in this position the injection of the half frame 7a of FIG. 15 inside the matrix 19 of the mould insert 9 is carried out, in cooperation with the punch 23 provided on the aforementioned mould insert 22 (FIGS. 3, 11a and 11b).

In the subsequent step the moving mould half 2 moves away from the fixed mould half 3, leaving on the matrix 19 of the mould insert 9 the half frame 7a moulded as above described.

From this position, the mould insert 9 is made to slide by the carriage 20 in the direction of the arrow F6 in FIG. 11b, towards the upper position 2b of the mould half 2, until it reaches the height of the part 3b of the mould half 3 (FIGS. 11b and 12). In this position the fabric 5 is unwound from the roller 4, in order to position it between the mould insert 9 and the upper mould insert 24 facing each other.

At this point the moving mould half 2 closes on the fixed mould half 3 in the direction of the arrow F7 in FIG. 12, with the return of the mould insert 9 inside its seat 21 of the carriage 20 of the moving mould half 2 (arrow F8).

In this step the following operations are carried out in an automatic way:

the locking in position of the filtering fabric 5 on the previously formed half frame 7a, by interference of the inserts 11 of the mould insert 9 of the mould half 2 with the inserts 12 of the upper mould insert 24 of the mould half 3;

the tensioning of fabric 5, in a centered position with respect to the half frame 7a housed in the moving mould insert 9, by insertion of the punches 13 of the same mould insert 9 inside the grooves 14 of the mould insert 24, with the dragging of a corresponding portion of fabric 5 inside these grooves and consequent tensioning of the fabric itself;

the moulding of the half frame 7b on the half frame 7a, so as to form the frame 7 of the filtering panel 8.

Then the fabric 5 is cut in its upper part by the blade 15, thus releasing it from the feeding roller 4.

The opening of the mould then leaves the filtering fabric 5, tensioned and fixed in a perfectly centered way on the frame 7, with some fabric portions in excess, protruding to the outside of the same frame and which may be easily removed in order to give the panel 9 the structure represented in FIG. 14.

The method of moulding the panel of the invention is preferably carried out at a temperature of 200-300° C. and at a holding pressure of the press in the moulding steps of two half frames of 25-50 bar, as well as at a conditioning temperature of the same mould of 20-60° C.

To the invention, as described above and illustrated in the Figures, it is possible to make some modifications in order to realize some variants which however are included in the scope of the following claims. Thus, for example, the material for the manufacturing of the frame 7 of the panel 8 may be any thermoplastic polymer, either reinforced or not, suitable for the injection moulding and preferably suitable for medical and food usage. On the other hand, the manufacturing material of the fabric 5 may consist in a polyamide, polyethers and the like.

The invention claimed is:

1. An equipment for the production of filtering panels (8) made up of a filtering fabric (5) locked and tensioned inside a frame (7) consisting of two mutually coupled half frames (7a,7b), said equipment including a press (6) and a mould half (2) movable with respect to a fixed mould half (3), characterized in that said moving mould half (2) is provided with a mould insert (9) sliding between a first position, for moulding the half frame (7a) of the panel (8), and a second position, for moulding the second half frame (7b) of the same panel (8) on said half frame (7a).

2. The equipment according to claim 1, characterized in that said moving mould half (2) is provided with a guide (10) for the sliding of said mould insert (9).

3. The equipment according to claim 2, characterized in that said fixed mould half (3) is provided with a mould insert (22) bearing a punch (23) for moulding said half frame (7a) in cooperation with a first matrix (19) of said moving mould insert (9).

4. The equipment according to claim 3, characterized in that said fixed mould half (3) further has a mould insert (24) provided with a second matrix (25) for moulding said half frame (7b).

5. The equipment according to claim 4, characterized in that said sliding mould insert (9) has inserts (11a, 11b, 11c, 11d) for locking the filtering fabric (5) by cooperating with corresponding inserts (12a, 12b, 12c, 12d) provided on said mould insert (24) of the fixed mould half (3).

6. The equipment according to claim 4, characterized in that said sliding mould insert (9) is provided with punches (13a, 13b, 13c, 13d) arranged close to said first matrix (19) and cooperating with the corresponding grooves (14a, 14b, 14c, 14d) arranged around or close to said second matrix (25) for moulding the half frame (7b) for the tensioning of the filtering fabric (5).

7. The equipment according to claim 2, characterized in that it further provides a carriage (20) for the sliding of said mould insert (9) in said guide (10).

8. The equipment according to claim 7, characterized in that said mould insert (9) is further movable inside a seat (21) in the carriage (20), in contrast to the action of springs (18).

9. The equipment according to claim 4, characterized in that it further includes a blade (15) housed in a corresponding seat (16) of said sliding mould insert (9), a corresponding cavity (17) being provided in said mould insert (24) to carry out the cutting of the fabric (5) fed by a respective roller (4).

\* \* \* \* \*